United States Patent [19]

Ushiro et al.

[11] Patent Number: 4,939,588
[45] Date of Patent: Jul. 3, 1990

[54] ELECTRONIC COPYING MACHINE

[75] Inventors: Seimei Ushiro; Kenta Namioka; Hiroshi Ohmura; Michio Cho; Kimiaki Nakada, all of Tokyo, Japan

[73] Assignee: Fuji Photo Film Co., Ltd., Kanagawa, Japan

[21] Appl. No.: 233,458

[22] Filed: Aug. 15, 1988

[30] Foreign Application Priority Data

Aug. 14, 1987 [JP] Japan ................. 62-202873

[51] Int. Cl.$^5$ ............................. H04N 1/40
[52] U.S. Cl. ....................... 358/401; 358/300
[58] Field of Search ............ 358/296, 285, 256, 257, 358/296, 401, 474, 494, 300

[56] References Cited

U.S. PATENT DOCUMENTS 4,574,317 3/1986 Scheible ..................... 358/286
4,611,246 9/1986 Nihei ......................... 358/256

FOREIGN PATENT DOCUMENTS 0030167 2/1986 Japan .

Primary Examiner—Edward L. Coles, Sr.
Assistant Examiner—Jerome Grant
Attorney, Agent, or Firm—Young & Thompson

[57] ABSTRACT

An electonic copying machine for making a hard copy of a remote original comprises a housing and an image pick-up unit pivotally mounted on the housing for vertical swinging movement between a raised use position and a lowered non-use position. In the housing, there are a scanner for scanning the remote original with a line of light projected through a transparent window plate, a recording head and image recording paper. In the image pick-up unit, there are a lens for forming a line image of the scanned remote original on the recording paper, a line image sensor for reading the line image formed thereon by the lens to provide line image signals according to which the image recording head records and image on the recording paper, shifting the line image sensor by a predetermined pitch in a direction perpendicular to the longitudinal direction of the line image sensor. When the image pick-up unit is folded down, the transparent window plate is covered by the image pick-up unit and the lens is received in a space formed in a corner of the housing and the electronic copying machine then has the shape of a generally rectangular box.

12 Claims, 4 Drawing Sheets

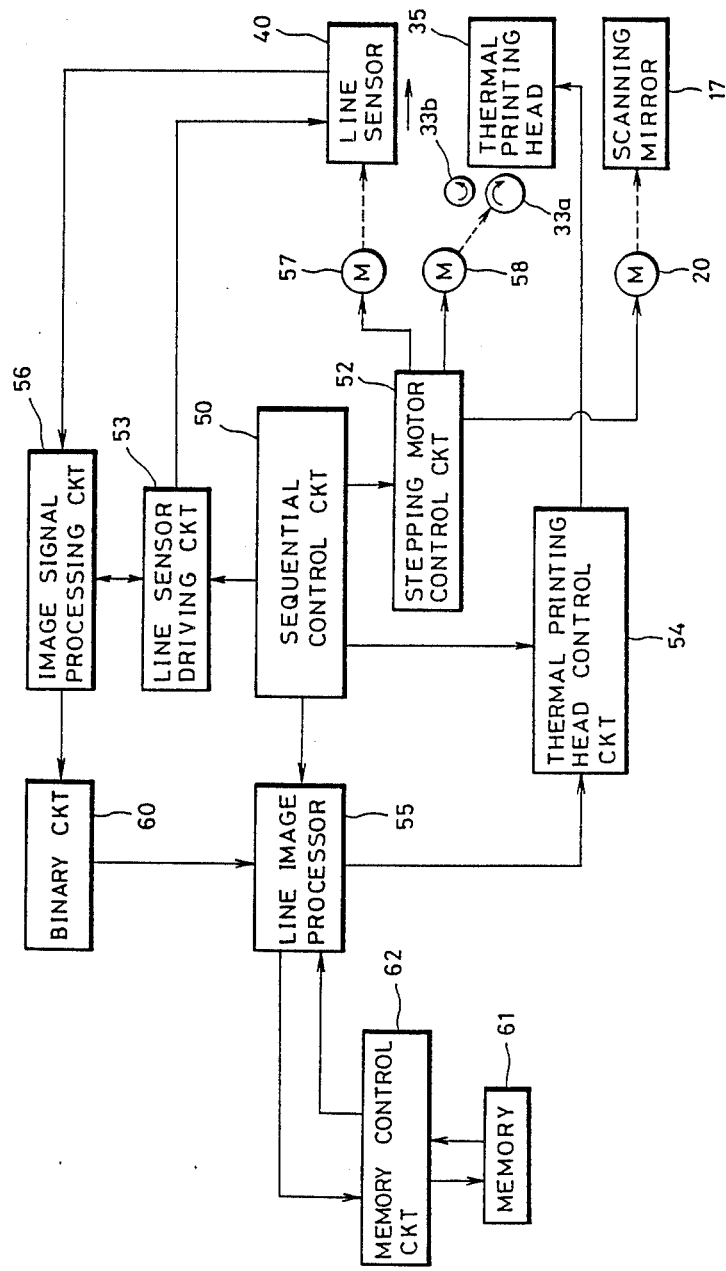

ELECTRONIC COPYING MACHINE

BACKGROUND OF THE INVENTION

The present invention relates to an electronic copying machine for making a hard copy of a remote image surface such as a writing board.

In recent years there have been developed electronic copying machines as so-called electronic writing boards which are writing boards capable of making a hard copy of notes, illustrations or the like written thereon or of notices tacked to the electronic writing boards. One such electronic writing board includes a writing surface such as the writing board itself or a sheet drawn over the writing board from a roll on which notes, illustrations or the like are written. An image of a desired part of the writing board or the sheet is electrically read by an image sensor such as a CCD sensor scanning the writing board and is printed out as a hard copy.

There have also been developed copying machines which have a video camera to take an image of a writing board or a sheet tacked to a writing board to provide a video image from which a hard copy is made.

Such electronic writing boards are not only inconvenient to carry around but also impossible to use to make hard copies of surfaces of generally available writing boards or written sheets tacked to generally available writing boards or walls. Copying machines having video cameras are expensive and heavy and bulky.

OBJECTS OF THE INVENTION

It is, therefore, an object of the present invention to provide an electronic copying machine suitable for making a hard copy of a remote surface such as that of a writing board or of a paper tacked to a writing board or a wall.

It is another object of the present invention to provide an electronic copying machine suitable for carrying around.

SUMMARY OF THE INVENTION

The above objects of the present invention are accomplished by providing an electronic copying machine comprising a housing and an image pick-up unit pivotally mounted on the housing for folding and unfolding movement. In the housing, there is a recording head for recording an image on recording paper. In the image pick-up unit, there are an image forming lens for forming a line image of the remote surface on its focal plane, a line image sensor disposed on the focal plane of the image forming lens for reading the line image formed by the image forming lens to provide line image signals according to which the recording had records an image on the recording paper, and shift means for moving the line image sensor by a predetermined pitch in the longitudinal direction of the image sensor.

When the image pick-up unit is folded, a transparent window plate through which light is projected to illuminate the surface to be copied, is covered by the image pick-up unit; and the image forming lens is received in a space formed in a corner of the housing, so as to configure the electronic copying machine when not in use in the form of a generally rectangular box.

BRIEF DESCRIPTION OF THE DRAWINGS

The above and other objects, features and advantages of the present invention will be fully understood from the following description taken by way of a preferred embodiment thereof with reference to the accompanying drawings wherein the same or similar parts are designated by like reference numerals throughout the several views of the drawings and in which:

FIG. 5 is a block diagram showing the control circuitry incorporated in the electronic copying machine of FIG. 1.

DETAILED DESCRIPTION OF THE INVENTION

Figure 1:
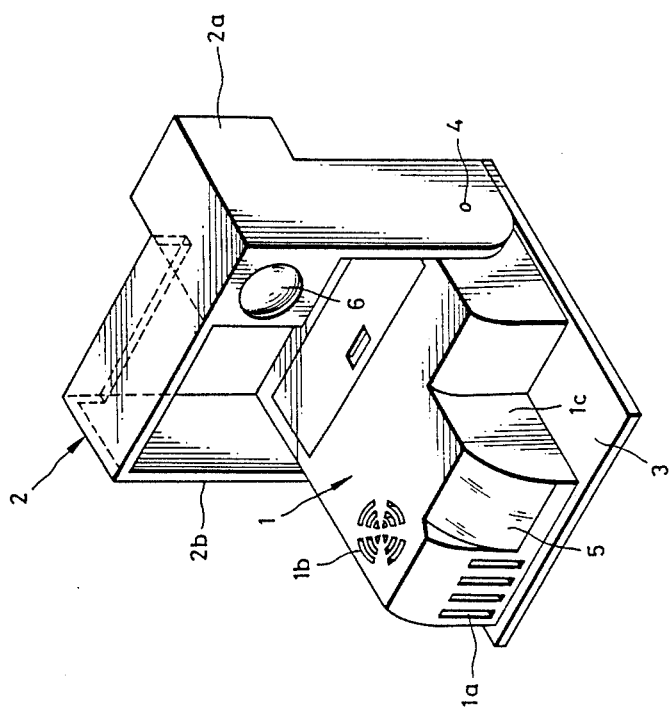
FIG. 1 is a perspective view showing an electronic copying machine in use, according to a preferred embodiment of the present invention.
Figure 2:
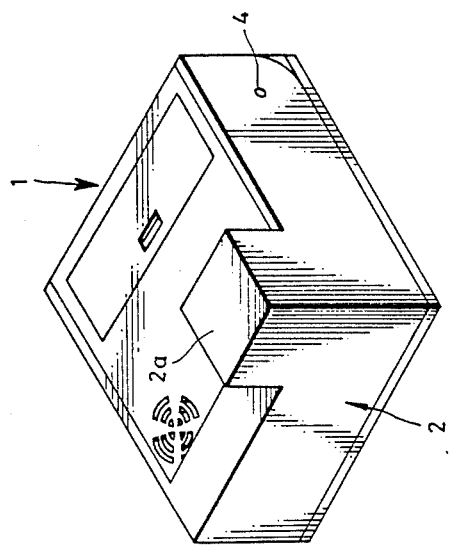
FIG. 2 is a perspective view showing the electronic copying machine of FIG. 1 when not in use.

Referring now to FIGS. 1 and 2 there is shown an electronic copying machine suitable for making a hard copy of, for example, a writing board remote therefrom. The electronic copying machine, which is shown as in use in FIG. 1 and out of use in FIG. 2, comprises a generally box-shaped base or housing 1 mounted on a base plate 3 and an image pick-up unit 2 having a box-shaped housing 2a and arm housing 2b. The image pick-up unit 2 is swingably supported by a pivot shaft 4 to turn about approximately a right angle so as to be raised or lowered. When raised, with the arm section 2b approximately upright, the image pick-up unit 2 is maintained in its raised position shown in FIG. 2 by means of a click stop mechanism (not shown) well known in the art. The image pick-up unit 2 is, when not in use, folded down as shown in FIG. 2 to provide a portable box-shaped electronic copying machine which is convenient for carrying and storage.

As is shown in FIG. 1, the housing 1 is formed with slits 1a in its front wall for admitting cool air and with exhaust slits 1b in its top wall for exhausting heated air. At the middle of the front wall, there is provided a transparent plate 5. In a front wall of the housing 2a of the image pick-up unit 2, there is a lens 6 for forming an image of a remote subject. In a corner of the base housing 1, there is a cut-out section 1c formed in a corner of the housing 1 for receiving the housing 2a when the image pick-up unit is folded.

Figure 3:
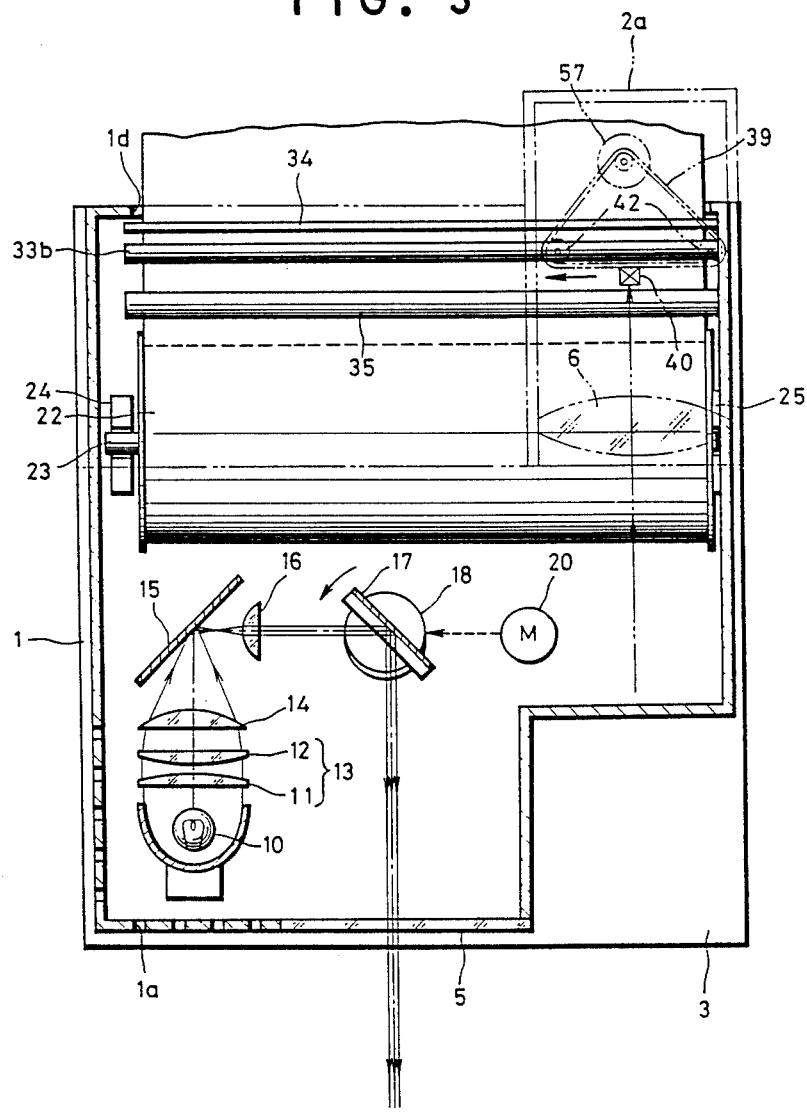
FIGS. 3 and 4 are sectional views showing details of interior mechanisms of the electronic copying machine of FIG. 1.
Figure 4:
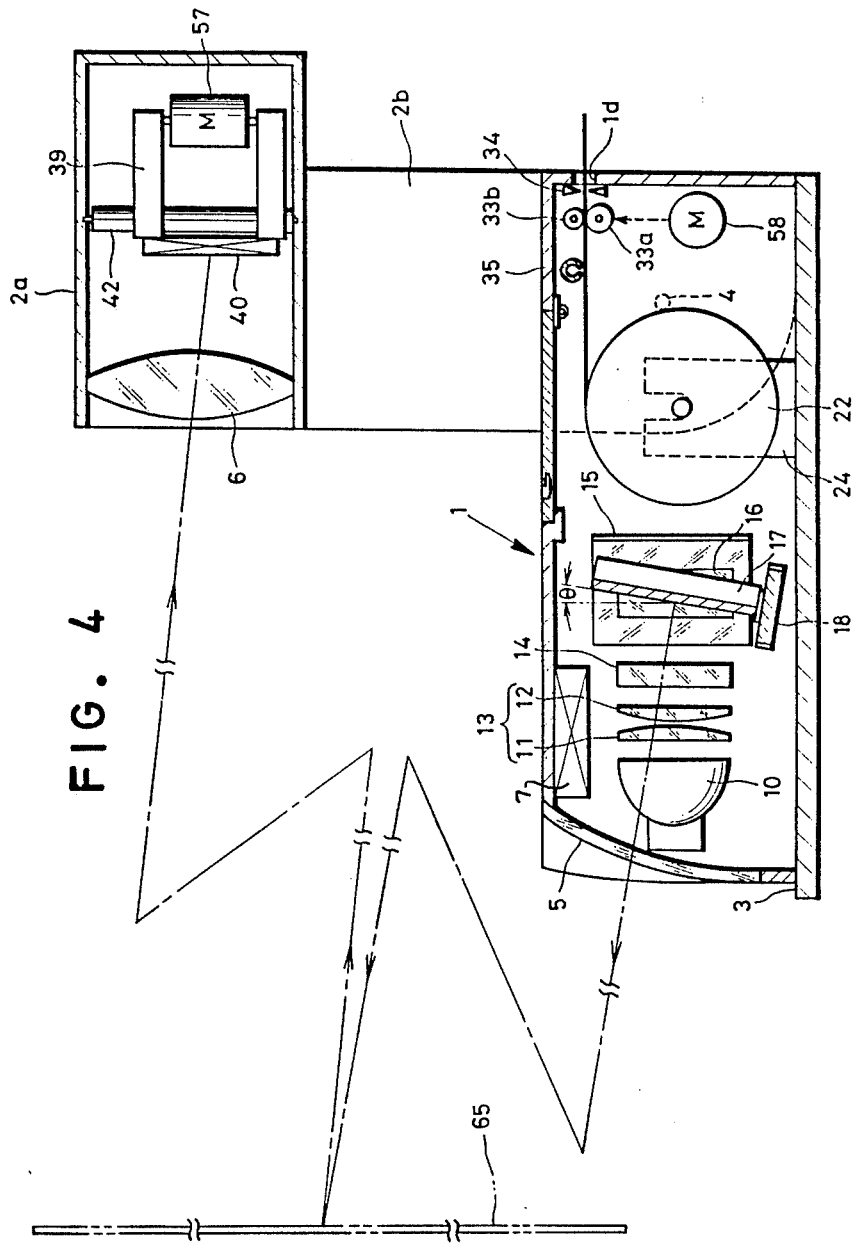

In FIGS. 3 and 4, showing details of the interior mechanisms of the electronic copying machine shown in FIGS. 1 and 2, there is shown in the housing 1 a halogen lamp 10 for projecting white illumination light in a backward direction. In line with the halogen lamp 10, there are a condenser lens system 13 comprising convex lenses 11 and 12 and a first cylindrical lens 14, and a mirror 15. This mirror 15 is fixedly disposed at a right angle with respect to the light path of the halogen lamp 10 so as to reflect the light from the halogen lamp 10 at a right angle toward a scanning mirror 17.

In the optical path between the fixed mirror 15 and the scanning mirror 17 there is a second cylindrical lens 16 for making parallel the rays of light projected from the halogen lamp 10 and reflected by the fixed mirror 15 and for arranging them in the configuration of a vertical line of light. The scanning mirror 17 is, as is clearly shown in FIG. 4, inclined at a slight angle $\theta$ relative to the vertical so as to project the light forwardly and upwardly at an angle $2\theta$ through the transparent plate 5. The scanning mirror 17 is mounted on a gear disk 18 which is rotated by an electric motor 20 through a gear train (not shown). Inside the housing 1 there is provided a fan 7 (see FIG. 4) disposed over the halogen lamp 10 and the lenses 13 and 14 for exhausting air heated by the halogen lamp 10, through the exhaust slits 1b.

The vertical line illumination system thus constituted is provided because the halogen lamp 10 is small and so emits only a small amount of light. On the contrary, if a large halogen lamp which radiates a large amount of light were used, it would illuminate the entire surface of a writing board without the provision of the cylindrical lenses 14, 16 and the scanning mirror 17, but would also emit a great deal of heat.

Behind the scanning mirror 17 there is a roll of heat-sensitive paper 22 supported by a shaft 23 removably supported for rotation by a pair of bearing arms 24 and 25. In the back wall of the housing 1, there is formed a delivery slit 1d for the heat sensitive paper 22. Between the heat sensitive paper 22 and the delivery slit 1d, there are transporting rollers 33a and 33b for transporting the heat sensitive paper 22 and a cutter 34 for cutting off the heat sensitive paper 22. Disposed adjacent to the roller 33b is a linear thermal printing head 35 for printing a thermal image on the heat sensitive paper 72. Under the thermal printing head 35, there is disposed an electric motor 58 for driving the roller 33a to advance the paper 22.

In the housing 2a of the image pick-up unit 2 there is a line sensor 40 comprising a CCD line image sensor disposed behind the image taking lens 6. As is clearly seen in FIG. 3, the line sensor 40 is attached to a belt 39 guided by means of a pair of rollers 42 and moved from right to left by means of an electric motor 57. The image taking lens 6 is designed to form a sharp image on the line sensor 40.

The electronic copying machine thus constructed is controlled by control circuitry shown in FIG. 5, including a sequential control circuit 50. The sequential control circuit 50 executes a sequential control of operation according to a sequence program memorized in a memory therein for a stepping motor control circuit 52, a line sensor driving circuit 53, a thermal printing head driving circuit 54 and a line image processor 55. This sequential control of operation is initiated by operating a copy switch (not shown) after exciting the halogen lamp 10.

Each circuit is operated under the control of the sequential control circuit 50 as follows:

the stepping motor control circuit 52 controls to drive the motors 20, 57 and 58 for the scanning mirror 17, line sensor moving belt 39, and transporting roller 33a in synchronism with one another. The line sensor driving circuit 53 drives the line sensor 40 with a drive signal synchronized with a drive signal for the electric motor 57 and actuates an image signal processing circuit 56 for processing image signals provided by the line sensor 40. The thermal printing head driving circuit 54 drives the thermal printing head 35 in synchronism with the electric motor 58 according to image data provided from a line image processor 55.

The line sensor 40 reads time serial image signals line by line and sends the time serial image signals to the image signal processing circuit 56. The image signal processing circuit 56 processes the image signals for each line with reference to driving signals provided by the line sensor 40 driving circuit 53 and transmits them after transformation into an analog form to a binary circuit 60. Here, the analog image signals are translated into binary signals with reference to a predetermined threshold level and sent as image data to the line image processor 55.

The line image processor 55 sends the image data thus digitalized to a memory device 61 through a memory control circuit 62 for memorization. The line image processor 55 reads out the image data in the memory device 61 through the memory control circuit 62 and sends them to the thermal head control circuit 54. The memory device 61 is used as a buffer memory to temporarily memorize image signals for several tens of line images processed by the line image processor 55.

In the operation of the electronic copying machine shown in FIGS. 1 through 4, the image pick-up unit 2 is raised to its operating position as is shown in FIG. 1 and placed on a table in front of a remote writing board 65 so as desirably to view the center of the writing board 65. The electronic copying machine may be placed in any desired position. When the electronic copying machine is powered, the halogen lamp 10 is excited to emit light toward the remote writing board 65. Simultaneously, the fan 7 is actuated to discharge air heated by the halogen lamp 10 through slits 1b. The scanning mirror 17 projects a vertical line of light onto the remote writing board 65. After adjusting the line of light to lie on an edge of the area of the remote writing board 65 to be copied, the copy switch is operated. Consequently, the sequential control circuit 50 executes the sequential program and sends various actuation signals to the stepping motor control circuit 52, line sensor drive circuit 53 and line image processor 55. Then, the stepping motor control circuit 52 causes the stepping motors 20 and 57 to rotate. Consequently, the scanning mirror 17 is turned in the direction shown by an arrow in FIG. 3 in synchronism with the lateral movement of the line sensor 40.

The light from the halogen lamp 10 is caused to converge as a thin vertical line of light by the condenser lens assembly 13 and the cylindrical lens 14. After having been reflected by the fixed mirror 15, the vertical line of light is lightly expanded in width by the cylindrical lens 16 and directed to the scanning mirror 17. The scanning mirror 17 scans the front surface of the remote writing board 65 with the vertical line of scanning light that has passed through the transparent plate 5.

Because the image taking lens 6 forms a sharply focused line image of the surface of the remote writing board 65 on the line sensor 40, the line sensor 40 provides time serial image signals for scanned lines in synchronism with the scanning mirror 17 which in turn are sent to the image signal processing circuit 56. With synchronizing signals provided by the line sensor driving circuit 53, the image signal processing circuit 56 processes the time serial image signals for each line image and then transmits the processed image signals to the binary circuit 60 for transformation into digital form. The line image processor 55 transmits the digital image data to be memorized in the memory device 61 through the memory control circuit 62.

When the scanning mirror 17 has scanned the entire desired area of the remote writing board 65, the line sensor 40 stops reading line images. As a result, image data for one frame, after having been transformed into digital form, are memorized in the memory device 61. The sequential control circuit 50 detects movement of the line sensor 40 to an extremity of the desired area, and provides the line sensor 40 with an end signal by which the stepping motor control circuit 52 reverses the electric motor 57 so as to return the line sensor 40 to the opposite extremity of the desired area. Upon the stopping of the electric motors 57 and 20, the sequential control circuit 50 provides the stepping motor control circuit 52, the line image processor 55 and the thermal printing head control circuit 54 with start signals, so that the electric motor 58 rotates the roller 33a to transport the heat sensitive sheet 22 toward the slit 1d.

The thermal printing head control circuit 54 drives the thermal printing head 35 in synchronism with the stepping motor 58, and hence the roller 33a, to form a thermal image on the heat sensitive sheet 22 according to the image data read out from the memory device 61 through the line image processor 55. After the completion of thermal printing for one frame, the sequential control circuit 50 provides the line image processor 55 and the thermal printing head control circuit 54 with end signals, and the stepping motor control circuit 52 with a control signal. Upon receipt of this control signal, the stepping motor control circuit 52 causes the electric motor 28 to turn so as to transport farther the heat sensitive sheet 22 in order to discharge the printed part of the heat sensitive sheet 22 from the apparatus through the slit 1d. Then, the sequential control circuit 50 terminates the sequential operation of printing. Thereafter, the cutter 34 is actuated to cut off the printed part of the heat sensitive sheet 22, thereby providing a hard copy.

After cutting off the printed part to provide a hard copy, the halogen lamp 10 is turned off. It is preferred to leave the fan 7 operating for a while so as to cool the inside of the apparatus. After the fan 7 is stopped, the image taking unit 2 is folded down as is shown in FIG. 2. In the folded position, the image taking unit 2 covers and protects the transparent plate 5 and, on the other hand, the lens 6 is received in the space 3c cut out of the corner of the housing 1 and protected by base plate 3 of the housing 1.

In this embodiment, if the line sensor 40 has a higher photosensitivity, the vertical line illumination system from the halogen lamp 10 to the scanning mirror 17 can be omitted. Furthermore, if the image processor 55 sends the image data to the thermal head control circuit 54, the memory device 61 and the memory control circuit 62 can be omitted.

Although the present invention has been fully described in connection with the preferred embodiments thereof with reference to the accompanying drawings, it is to be noted that the possibility of various changes and modifications will be apparent to those skilled in the art. Therefore, unless otherwise such changes and modifications depart from the scope of the present invention, they should be construed as included therein.

What is claimed is:

1. An electronic copying machine for making a hard copy from an original remote therefrom, comprising:
   a housing comprising a supporting base of the machine;
   an image pick-up unit pivotally mounted on said housing for vertical swinging movement relative to the housing about a horizontal axis, between a raised operative position and a lowered inoperative position;
   a line image sensor disposed in said image pick-up unit for sensing a remote original line by line to generate line image signals;
   shift means in said image pick-up unit for moving said line image sensor in a direction parallel to a said sensed line image;
   a recording head disposed in said housing for recording an image of said remote original according to said line image signals; and
   a line illuminating system in said housing for directly projecting a line of light onto said remote original in the longitudinal direction of said line image sensor.

2. An electronic copying machine as defined in claim 1, wherein said housing has a transparent window plate through which said line of light passes to said remote original.

3. An electronic copying machine as defined in claim 2, wherein said image pick-up unit covers said transparent window plate when lowered.

4. An electronic copying machine as defined in claim 1, wherein said image pick-up unit has a lens for focusing said remote original on said line image sensor and said housing has a space formed in a corner thereof for receiving said lens when said image pick-up unit is lowered.

5. An electronic copying machine as defined in claim 4, wherein said image pick-up unit when lowered forms with said housing a rectangular box.

6. An electronic copying machine as defined in claim 1, and a roll of recording paper disposed in said housing.

7. An electronic copying machine as defined in claim 6, wherein said image recording head is a thermal printing head.

8. An electronic copying machine as defined in claim 7, wherein said image recording paper is heat sensitive.

9. An electronic copying machine as defined in claim 4, said lens facing downward in said lowered position of said image pick-up unit.

10. An electric copying machine as defined in claim 1, said housing having on its rear side a delivery outlet through which hard copies are issued.

11. An electric copying machine as defined in claim 1, wherein said image pick-up unit has a pair of arm sections between which said housing is sandwiched.

12. An electric copying machine as defined in claim 11, wherein said arm sections support a box-shaped housing therebetween, said box-shaped housing being received in a cut-out section formed in said housing when said image pick-up unit is lowered, forming with said housing a substantially rectangular box.

* * * * *